DIAL LONG LINE CIRCUIT

Filed Dec. 13, 1965

INVENTOR
RONALD V. MUNRO
BY HIS ATTORNEYS
HARRIS, KIECH, RUSSELL & KERN

INVENTOR
RONALD V. MUNRO
BY HIS ATTORNEYS
HARRIS, KIECH, RUSSELL & KERN

United States Patent Office 3,432,620
Patented Mar. 11, 1969

3,432,620

DIAL LONG LINE CIRCUIT

Ronald V. Munro, Woodland Hills, Calif., assignor to Scantlin Electronics, Inc., Los Angeles, Calif., a corporation of Delaware Filed Dec. 13, 1965, Ser. No. 513,455
U.S. Cl. 179—16 10 Claims
Int. Cl. H04m 3/02

ABSTRACT OF THE DISCLOSURE

Long line circuit for coupling subscriber to switching equipment. Controls ringing at subscriber's set by means of amplifiers and relays. Generates supervisory signals for off-hook state and dial pulsing. Provides circuit options which can be selected to coincide with particular associated equipment.

Figure 1:
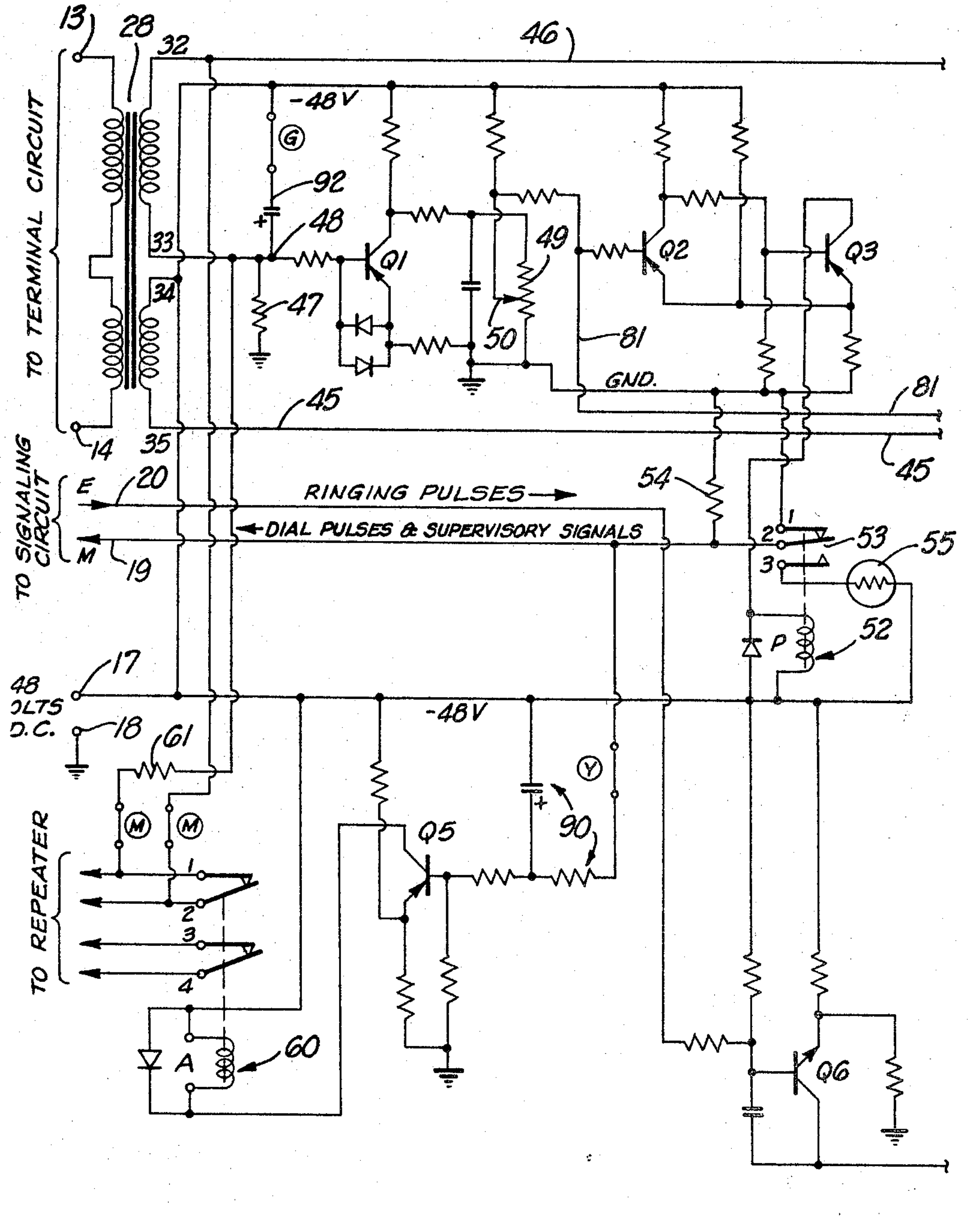

This invention relates to a device for coupling a telephone subscriber to switching equipment where the subscriber is a relatively long distance from the switching equipment. Devices of this type are currently in use and are sometimes referred to as dial long line circuits.

The distance between a subscriber and the switching equipment or the dial long line circuit is ordinarily measured in terms of the ohms resistance of the two-wire line between the subscriber and the dial long line circuit, typically between the dial phone at the subscriber's residence or place of business and an equipment rack of the telephone company. The limit of present-day devices is about 3,000 ohms. It is an object of the invention to provide a new and improved coupling circuit which will double or triple the operating range. One physical embodiment of the present invention is rated for operation at 7,000 ohms maximum and actually has been operated at 10,000 ohms maximum representing a distance of thirty to forty miles.

It is an object of the invention to make a new and improved coupling device which is considerably smaller and lighter than existing equipment. A further object is to provide such a dveice in which adjustment and maintenance problems are substantially eliminated. An additional object is to provide such a device which may be directly substituted for existing equipment.

It is an object of the invention to provide a device for coupling a telephone subscriber to switching equipment where the subscriber may be a relatively long distance from the device and where the device also may be a relatively long distance from the switching equipment. Present-day equipment utilizes repeaters for voice signals between dial long line units and the central station for remotely located units. However, the use of repeaters as amplifiers with supervisory signals has not been satisfactory so that the resistance of the supervisory loop determines the maximum distance permissible. Accordingly, it is an object to provide a new and improved device which will permit tripling of the supervisory loop resistance and hence of the maximum distance between the switching equipment and the dial long line unit. In the particular embodiment referred to above, the maximum supervisory loop resistance is 10,000 ohms, as compared to 3,000 ohms for the present-day equipment.

It is a specific object of the invention to provide a new and improved dial long line unit for control of ringing at the subscriber's set and utilizing one amplifier and relay driven by the ringing signal from the central station to actuate another relay for connecting the subscriber's set to the ringing power source. An additional object is to provide a control network, amplifier and relay for tripping off the ringing power when the subscriber's telephone is uncradled. A further object is to provide such a device which may be operated with ground potential ringing pulses or with open circuit ringing pulses.

It is an object of the invention to provide a new and improved dial long line unit for generating supervisory signals when the subscriber's set is uncradled and dial pulses when the dial is actuated and incorporating an amplifier and pulse shaper circuitry for controlling a supervisory signal relay. An additional object is to provide such a device including controls for externally positioned repeaters where utilized. An additional object is to provide such a unit incorporating means for preventing the generation of false supervisory signals during the ringing operation.

It is a particular object of the invention to provide a new and improved device which may incorporate several circuit options depending upon the specific equipment with which the device is operated. A further object is to provide such a device wherein the various options can be selected by connecting or disconnecting specific circuit links. A further object is to provide such a device wherein the option links are presented at exposed terminal pairs between which wire connections can be made and can be severed at will.

Other objects, advantages, features and results will more fully appear in the course of the following description. The drawings merely show and the description merely describes a preferred embodiment of the present invention which is given by way of illustration or example.

Figure 2:
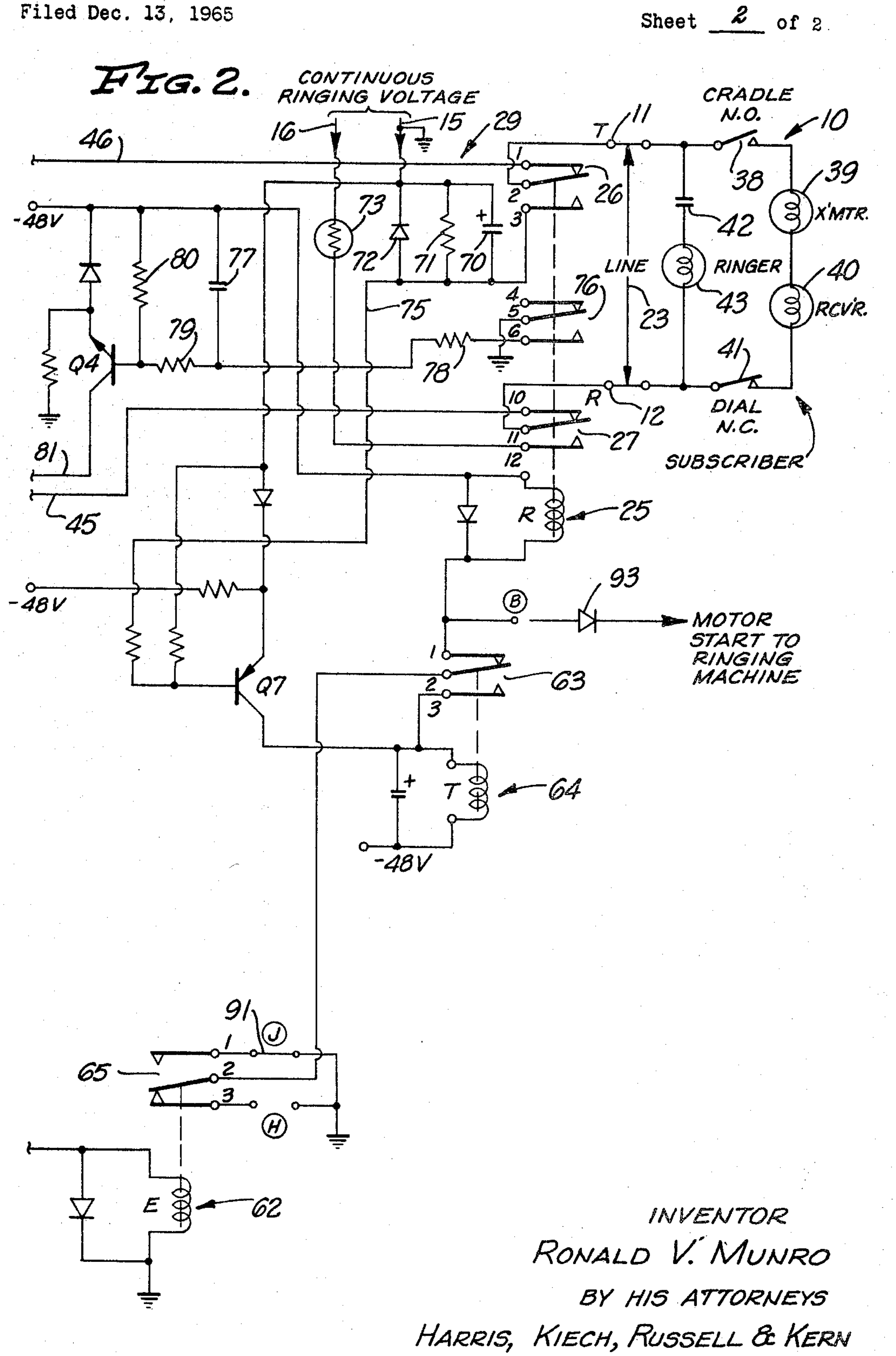

FIG. 1 is the left portion and FIG. 2 is the right portion of a schematic diagram illustrating the device of the invention with a subscriber's set coupled thereto.

The unit of the invention provides connections between a subscriber's set shown diagrammatically at 10 and the telephone company switching equipment. The unit includes a set of terminals 11, 12 for connection to the subscriber's lines, another set of terminals 13, 14 for connecting the voice lines to the switching equipment, another set of terminals 15, 16 for connection to a source of ringing power, and another set of terminals 17, 18 for connection to a D.C. voltage source.

In a typical installation, the ringing power is 105 volts a.c. and the D.C. voltage source is 48 volts with the positive terminal connected to circuit ground. The unit also includes a signalling terminal 19 for connection to the telephone company switching equipment and a ringing terminal 20 for connection to a ringing signal source at the switching equipment.

The subscriber's set 10 may be located a considerable distance from the dial long line unit and is connected thereto by a two-wire line 23, which line may have a maximum resistance in the order of 7,000 to 10,000 ohms. The dial long line unit may be positioned at the telephone company switching equipment or may be positioned a distance therefrom. The voice line connected between the switching equipment and terminals 13, 14 may incorporate one or more repeater amplifiers. The signalling line connected between the switching equipment and terminals 19, 20 does not utilize repeater amplifiers and may have a maximum resistance in the order of 10,000 ohms. Conventional repeater amplifiers are not useable for signalling in the subscriber's loop line 23 and in the signalling line because these lines must transmit the dial pulses which are very low frequency. A typical dial pulse rate is in the order of ten pulses per second. The present unit will handle dial pulses over the range of about two to twenty-five pulses per second.

A relay 25 has contact sets 26, 27 for selectively connecting the subscriber's line at terminals 11, 12 to the switching equipment at terminals 13, 14 via a transformer 28 and to the ringing power source at terminals 15, 16 through a network 29. The transformer 28 is used with the conventional two-wire operation. For the conventional four-wire operation, the transformer is omitted and connection is made to a four-wire terminating circuit at points 32, 33, 34, 35.

The subscriber's set 10 is indicated diagrammatically and includes a D.C. loop with the normally open cradle switch 38, the transmitter coil 39, the receiver coil 40, and the normally closed dial switch 41. The ringing circuit is connected in parallel with the D.C. loop and includes a capacitor 42 and the ringer 43.

When the subscriber's set is uncradled, the switch 38 is closed providing a D.C. path from the —48 volts terminal 17, one half of the primary of the transformer 28, voice line 45, contact set 27 of relay 25, the subscriber's loop, contact set 26 of relay 25, voice line 46, the other half of the primary of the transformer 28, and a resistor 47 to circuit ground. Closing of the cradle switch produces a voltage change at point 48 which serves as the input to a voltage amplifier incorporating transistor Q1. The output of the amplifier is developed across a potentiometer 49 with the arm 50 thereof serving as the input to a signal shaping circuit incorporating transistors Q2 and Q3.

The shaper circuit, which may be a Schmitt trigger circuit, drives a signalling relay 52 having a contact set 53 which connects the terminal 19 to circuit ground and to a negative voltage level determined by a resistor 54 and a ballast tube resistor 55.

A repeater control relay 60 may be incorporated in the unit and is controlled by the voltage at terminal 19 via an amplifier incorporating transistor Q5. The repeater control relay provides a short circuit between terminals 1 and 2 and between terminals 3 and 4 of the repeater lines. Terminals 1 and 2 also serve to shunt a resistor 61 across one half of the primary winding of the transformer 28, this arrangement being utilized for impedance matching with the repeater circuitry. All of the switches and relays are illustrated in FIGS. 1 and 2 in the normal condition when the subscriber's set is not in use.

Ringing pulses or signals from the central station appear at terminal 20 and are utilized for actuating the relay 25 to connect the ringing voltage source to the subscriber's set. A ringing signal may be either ground potential or open circuit and in either event is coupled through an amplifier incorporating transistor Q6 to drive a relay 62. One end of the coil of the relay 25 is connected to —48 volts directly and the other end is connected through a contact set 63 of a relay 64 and through a contact set 65 of the relay 62 to circuit ground. The relay 62 and the relay 25 are actuated for the duration of each ringing pulse, connecting the ringing power to the subscriber's set for energizing the ringer 43.

When the subscriber's telephone is uncradled during the silent interval between rings, closing of the cradle switch 38 serves to actuate the signalling relay 52, providing a supervisory signal at terminal 19 for terminating the ringing pulses. This operation cannot occur during the ringing interval since the subscriber's line is not connected to the voice lines 45, 46. When the cradle switch is closed during the ringing interval, a signal is generated in the network 29 for driving the relay 64 through an amplifier incorporating transistor Q7 to open the contact set 63 and thereby de-energize the coil of the relay 25. This prevents any ringing sound in the subscriber's receiver and also connects the subscriber's line across the voice lines and actuates the signalling relay 52 to terminate further ringing.

The network 29 includes a capacitor 70 for bypassing the A.C. ringing power around a resistor 71. A diode 72 is connected in parallel with the capacitor 70 to protect the capacitor against reverse voltages. A conventional ballast resistor 73 is connected in the ringing power circuit, but is not a part of the network 29. The ringing voltage typically is 105 volts A.C. super-imposed upon the D.C., and the terminal 15 normally is connected to circuit ground. Closing of the cradle switch 38 at the subscriber's set completes a D.C. path through the resistor 71 and the subscriber's loop, providing a signal on line 75 as an input to the Q7 amplifier. This D.C. path is opened when the relay 25 is de-energized.

At the termination of a ringing pulse, the charge built up in the subscriber's loop by the ringing power source tends to generate a voltage on the voice lines 45, 46 which simulates closing of the cradle switch 38 to actuate the signalling relay 52. An additional circuit is incorporated for preventing this operation and includes another contact set 76 on the relay 25. During the ringing interval, a capacitor 77 is charged from the D.C. supply through a resistor 78 and terminals 6 and 5 of the contact set 76. During the silent interval between ringing pulses, this charge is dissipated through resistors 79, 80. The junction of the resistors 79, 80 provides an input to an amplifier incorporating transistor Q4 with the output thereof coupled on line 81 to the input of the signal shaper circuit transistor Q2. For an initial period of time after termination of a ringing pulse, the voltage on the capacitor 77 is sufficient to block any operation of the signalling relay 52 by the shaper circuit. The values of the circuit components are selected so that this blocking action extends for a period of time longer than that necessary for a decay of the charge on the subscriber's loop. Typically this may be about twenty milliseconds.

With the unit in the condition as shown in FIGS. 1 and 2, it is ready to receive a call or to place a call. When the subscriber wishes to place a call, he uncradles his set, closing the switch 38, closing the D.C. loop through the subscriber's set. The D.C. voltage change occurring at the point 48 is amplified and shaped to provide a voltage for driving the signalling relay 52. The pulse shaping circuit, incorporating the potentiometer 49 and the Schmitt trigger, provides for adjustment of the portion or percent of the dial pulse which is not ground (at the terminal 19) and the portion which is at a potential with respect to ground. A dial pulse should be 50% ground and 50% negative potential for correct operation of the switching equipment. Adjustment in the dial long line unit is desired to match variations found in individual telephone dials and transmission facilities. The setting of the potentiometer arm 50 determines the point at which the Schmitt trigger actually triggers.

Actuation of the signalling relay 52 provides a negative voltage at the terminal 19, which is the desired supervisory signal to the switching equipment indicating that the subscriber is going to place a call. The dial office circuit is prepared for receiving dial pulses. Actuation of the dial opens the switch 41, with an opening and closing operation being performed for each digit dialed. This produces a string of dial pulses at the terminal 48 with the pulses being amplified and shaped for pulsing the signalling relay 52, providing the positive going dial pulses at the terminal 19. When the called party is connected, the subscriber is ready to talk. When the call is completed, the subscriber recradles his telephone, opening the switch 38 which opens the D.C. loop and de-energizes the relay 52.

If the repeater control relay 60 is incorporated in the unit, uncradling of the subscriber's set serves to energize the relay 60 and unshort the repeater lines, and dialing a digit de-energizes the relay and shorts the lines. A resistance-capacitance network 90 is provided at the input to the Q5 amplifier for maintaining an amplifier input signal to keep the relay 60 de-energized during the dial pulses of a digit so that the relay does not follow individual dial pulses.

Signals for incoming calls appear at the terminal 20. In one mode of operation, the terminal 20 is normally grounded and is opened for each ringing pulse, which produces a negative going pulse at the input of the Q6 amplifier. The negative going pulse de-energizes the relay 62, closing the terminals 1 and 2 thereof to energize relay 25 and apply the ringing power to the subscriber's set. When the subscriber answers, the ringing pulses will be shut off as described above.

In some installations, the terminal 20 is normally open and is grounded by a ringing pulse, thereby providing a positive going pulse at the input of the Q6 amplifier. This results in the relay 62 being normally de-energized and being energized by a ringing pulse. This reversal in operation may be taken care of by providing an optional connection at the contact set 65. A pair of terminals indicated at H is provided between terminal 3 and circuit ground and another pair of terminals indicated at J is provided between terminal 1 and circuit ground. The terminals H and J preferably are upwardly projecting from a circuit board or other base permitting a direct wire connection therebetween, as indicated at 91 for the pair J. The pairs H and J will be positioned on the unit at a readily accessible location and will be identified by the respective letters H and J. The unit may be provided with wire connections between both pairs and one may be clipped out prior to installation, depending upon the particular type of ringing pulse provided. The units may also be provided with one or the other of the pairs connected or with neither connected. Regardless of the initial condition, prior to installation one appropriate pair is jumpered and the other appropriate pair is disconnected, but the unit is readily changed for a different installation.

Additional optional installations are provided for other portions of the circuit, preferably utilizing the same arrangement of a pair of terminals with a disconnectible wire connection therebetween.

The repeater control relay circuit may be provided with three such terminal pairs including the input to the amplifier at Y and two connections to the terminals 1, 2 at M. Another jumper is provided at G for disconnecting a capacitor 92 at the input of the Q1 amplifier. This capacitor is utilized in some installations for impedance matching and when it is not desired, the jumper at G is severed. Another option connection is shown at B where a signal for starting the ringing machine is provided via the contact set 63. In some installations, the ringing power source is always on while in other installations, the power source is turned on only when ringing power is required. The cathode of a diode 93 has been brought to an external terminal B. If the unit is to be installed at a location where the ringing power source is on at all times, the diode cathode is not connected at B.

The terminal pairs for each of the jumpers may be installed in a row at a readily accessible spot on the chassis or circuit board, with each pair identified by the appropriate code letter. This permits ready modification of a unit to correspond to a particular installation and easy modification again when the unit is to be installed in a different situation.

The coupling unit of the present invention is directly substitutable for existing coupling units while providing for substantial increase in line resistance or its equivalent, distance between the subscriber and the unit and between the unit and the telephone company switching equipment. At the same time, the unit of the invention is substantially smaller and lighter than existing equipment. A typical unit of the present invention weighs three to four pounds, depending upon the particular transformer utilized, as compared with conventional equipment weighing in excess of twenty pounds. This unit is contained in a package about two inches by eight inches by twelve inches in contrast to the present-day package about six inches by twelve inches by twenty-four inches. At the same time, the problems of adjustment and maintenance encountered in conventional equipment are substantially eliminated. One adjustment is provided in the circuit of the invention, this being the potentiometer 49 which is set initially depending upon the resistance in the subscriber's loop. Sensitive relays and the maintenance problems associated therewith are eliminated.

Although an exemplary embodiment of the invention has been disclosed and discussed, it will be understood that other applications of the invention are possible and that the embodiment disclosed may be subjected to various changes, modifications and substitutions without departing from the spirit of the invention.

I claim as my invention:

1. In a device for coupling a telephone subscriber to switching equipment where the subscriber is a relatively long distance from the switching equipment, the subscriber's set including a cradle switch, a dial switch and a pair of lines, the device including a first set of terminals for connection to the subscriber's lines, a second set of terminals for connection to the switching equipment, a third set of terminals for connection to a source of A.C. ringing power, a first relay for selectively connecting said first set to said second set and to said third set, a fourth set of terminals for connection to a D.C. voltage source, a signalling terminal for connection to the switching equipment, and a ringing terminal for connection to a ringing signal source at the switching equipment, the improvement comprising in combination:

a second relay having a normally open contact pair;

a third relay having a normally closed contact pair;

first circuit means for connecting the coil of said first relay across said fourth set for controlling said first relay and including said second relay contact pair and said third relay contact pair in series;

a first amplifier having said ringing terminal coupled thereto as an input and providing an output for controlling said second relay to maintain the contact pair thereof closed for one ringing signal condition and to open the contact pair for the other ringing signal condition and thereby actuate said first relay; and a second amplifier for controlling said third relay to open the contact pair thereof when said first relay is connecting said first set to said third set and the subscriber's cradle switch is closed, thereby changing said first relay to connect said first set to said second set, said second amplifier including an input network connected between said first and third sets providing an input signal to the amplifier for a D.C. level change at the network.

2. A device as defined in claim 1 wherein said input network of said second amplifier includes a resistance connected in series in a D.C. path when the cradle switch is closed and a capacitance providing an A.C. bypass of said resistance for the ringing power.

3. A device as defined in claim 1 wherein:

said second relay has a single pole, double throw contact group providing normally open and normally closed contact pairs; and said first circuit means includes means for selectively connecting one of said second relay contact pairs and said third relay contact pair in series.

4. A device as defined in claim 3 wherein said selecting means of said first circuit means comprises two exposed wiring terminal pairs, with each pair identified by a visual code, and means for making a separable electrical connection between the terminals of a pair.

5. A device as defined in claim 1, including:

second circuit means providing a series circuit across said fourth set and including said first relay, said first set, said second set and a signal point, whereby the subscriber's cradle switch and dial switch are connected across the D.C. voltage source when said first relay is connecting said first set to said second set, with actuation of the cradle switch producing a step signal at said signal point and actuation of the dial switch producing a pulse signal at said signal point;

a signal amplifier and shaper providing an output voltage change of predetermined amplitude for an input change above a minimum value and providing an output pulse of predetermined amplitude andl duration for each input pulse above a minimum value, with the input thereof coupled to said signal point; and a signalling relay controlled by the shaper output for switching said signalling terminal from one voltage level to another on operation of the subscriber's cradle switch indicating that the subscriber's set is now in use to terminate the ringing signal if responding to a call and to find a line if initiating a call and cycling said signalling terminal between the voltage levels for each operation of the dial switch when making a call.

6. A device as defined in claim 5, including:

a temporary storage network including means for dissipating a charge therein;

means actuated by one of said first and second relays for charging said storage network to produce a blocking signal when said first relay is connecting said first set to said third set; and means for connecting said blocking signal to said amplifier and shaper for blocking any output thereof until said storage network charge is dissipated after said first relay is actuated to connect said first set to said second set.

7. In a device for coupling a telephone subscriber to switching equipment where the subscriber is a relatively long distance from the switching equipment, the subscriber's set including a cradle switch, a dial switch and a pair of lines, the device including a first set of terminals for connection to the subscriber's lines, a second set of terminals for connection to the switching equipment, a third set of terminals for connection to a source of ringing power, a first relay for selectively connecting said first set to said second set and to said third set, a fourth set of terminals for connection to a D.C. voltage source, a signalling terminal for connection to the switching equipment, and a ringing terminal for connection to a ringing signal source at the switching equipment, the improvement comprising in combination:

circuit means providing a series across said fourth set and including said first relay, said first set, said second set and a signal point, whereby the subscriber's cradle switch and dial switch are connected across the D.C. voltage source when said first relay is connecting said first set to said second set, with actuation of the cradle switch producing a step signal at said signal point and actuation of the dial switch producing a pulse signal at said signal point;

a signal amplifier and shaper providing an output voltage change of predetermined amplitude for an input change above a minimum value and providing an output pulse of predetermined amplitude and duration for each input pulse above a minimum value, with the input thereof coupled to said signal point; and a signalling relay controlled by the shaper output for switching said signalling terminal from one voltage level to another on operation of the subscriber's cradle switch and cycling said signalling terminal between the voltage levels for each operation of the dial switch.

8. A device as defined in claim 7, including:

a repeater control relay including a normally closed contact pair for at least partially shunting the subscriber's lines; and a repeater amplifier having said shaper output as an input for actuating said repeater control relay to open said contact pair thereof following said output voltage change resulting from closing of the cradle switch, said repeater amplifier including a storage network for preventing operation of said repeater control relay in response to individual shaper output pulses.

9. A device as defined in claim 8, including:

a plurality of exposed wiring terminal pairs, with each pair identified by a visual code; and means for making a separable electrical connection between the terminals of a pair, with one of said terminal pairs connected in series in said repeater amplifier input and with two of said terminal pairs connected between said contact pair of said repeater control relay and the subscriber's lines.

10. A device as defined in claim 7 wherein said amplifier and shaper includes a trigger circuit with a variable voltage divider as an input control of the triggering point.

References Cited

UNITED STATES PATENTS

| | | |
|---|---|---|
| 1,898,063 | 2/1933 | Richardson. |
| 2,260,722 | 10/1941 | Low. |

KATHLEEN H. CLAFFY, *Primary Examiner.*

W. A. HELVESTINE, *Assistant Examiner.*

UNITED STATES PATENT OFFICE

CERTIFICATE OF CORRECTION

Patent No. 3,432,620 — March 11, 1969

Ronald V. Munro

It is certified that error appears in the above identified patent and that said Letters Patent are hereby corrected as shown below:

Column 7, line 6, "andl" should read -- and --; line 46, after "series" insert -- circuit --.

Signed and sealed this 31st day of March 1970.

(SEAL)
Attest:

Edward M. Fletcher, Jr.
Attesting Officer

WILLIAM E. SCHUYLER, JR.
Commissioner of Patents